Figure 4:
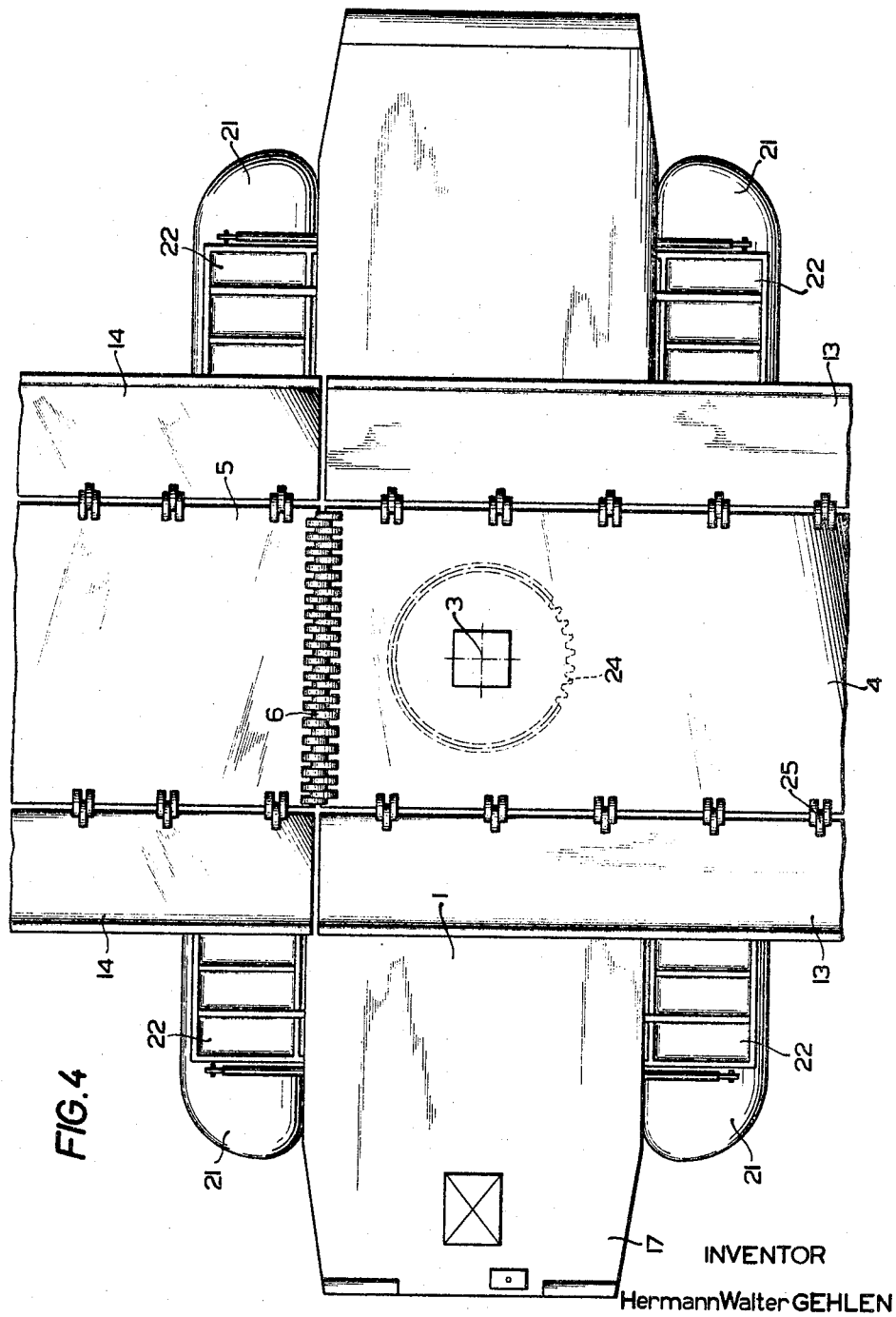

Aug. 30, 1966  H. W. GEHLEN  3,269,349
AMPHIBIOUS VEHICLE
Filed March 5, 1965  6 Sheets-Sheet 1
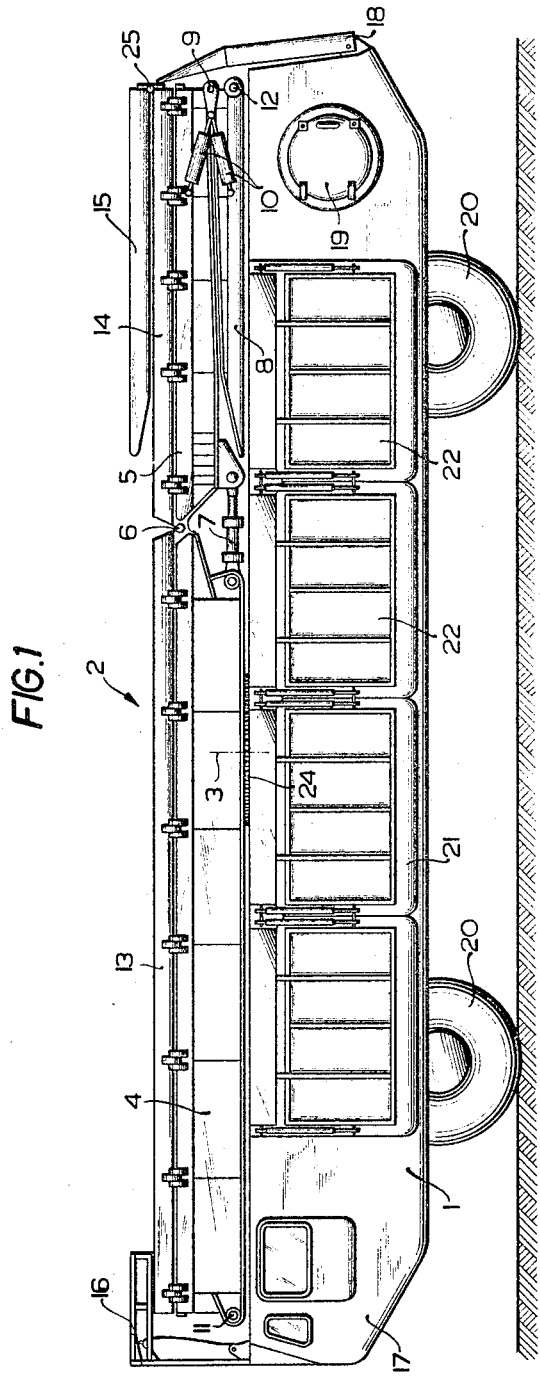
INVENTOR
HermannWalter GEHLEN
BY *Robert H. Jacob*
AGT

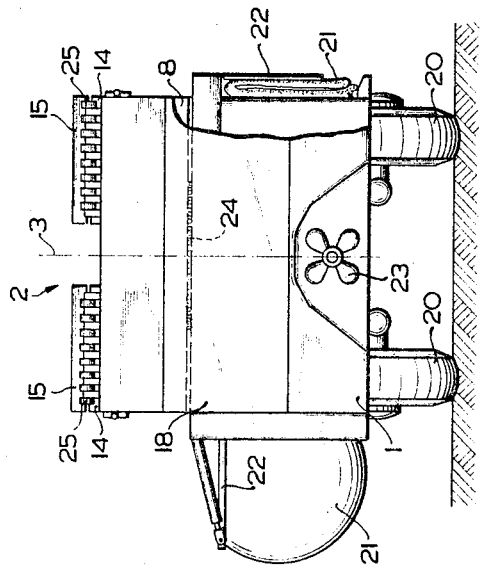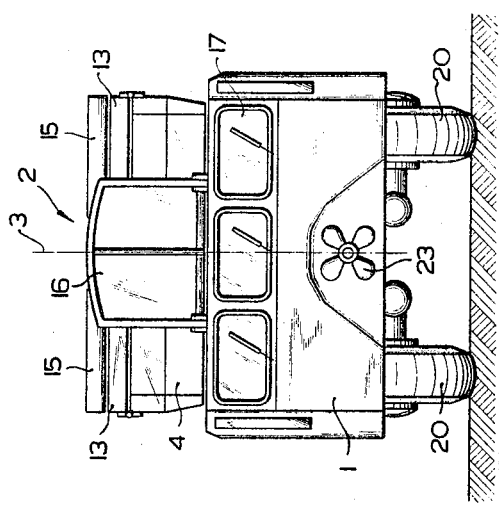

Aug. 30, 1966   H. W. GEHLEN   3,269,349
AMPHIBIOUS VEHICLE
Filed March 5, 1965   6 Sheets-Sheet 3

INVENTOR
Hermann Walter GEHLEN

BY Robert H. Jacob
AGT.

Aug. 30, 1966  H. W. GEHLEN  3,269,349
AMPHIBIOUS VEHICLE

Filed March 5, 1965  6 Sheets-Sheet 4

INVENTOR
HermannWalter GEHLEN

BY *Robert H. Jacob*

AGT.

Aug. 30, 1966  H. W. GEHLEN  3,269,349
AMPHIBIOUS VEHICLE

Filed March 5, 1965  6 Sheets-Sheet 5

INVENTOR
Hermann Walter GEHLEN

Aug. 30, 1966 H. W. GEHLEN 3,269,349
AMPHIBIOUS VEHICLE
Filed March 5, 1965 6 Sheets-Sheet 6

INVENTOR
Hermann Walter GEHLEN

BY Robert T. Jacob
AGT.

United States Patent Office 3,269,349
Patented August 30, 1966

3,269,349
AMPHIBIOUS VEHICLE
Hermann Walter Gehlen, Pirmasenser Strasse 60,
Kaiserslautern, Pfalz, Germany
Filed Mar. 5, 1965, Ser. No. 437,363
Claims priority, application Germany, Mar. 28, 1964,
E 26,724
5 Claims. (Cl. 115—1)

The present invention relates to amphibious vehicles and is particularly concerned with such a vehicle that can be deployed as extensively in water as on land, and which is especially well adapted to negotiate the border regions between water and land, particularly to manage and bridge the banks without auxiliary help, and finally to serve in different capacities of deployment such as taking on and transporting loads across water.

The preferred use of the vehicle is to constitute a floating bridge by using a plurality of vehicles which connects the opposite banks of a waterway and which is anchored at a location provided for the bridge so that it constitutes a permanent connection between the two banks. A further possibility of deployment exists in loading the amphibious vehicles individually and to deploy them in shuttle traffic between the two banks. A third possibility of use for the vehicles is in the form of a ferry having considerable carrying capacity that is assembled from a plurality of such vehicles and which then can be deployed in shuttle traffic.

In the first and in the third case of use as aforementioned the vehicles must be constructed in a manner that they can be connected with one another. This must necessarily be in a manner that a closed track or loading surface is formed. In the first and in the last case at least a part of the vehicle must have ramp members which serve to provide a suitable traffic carrying connection between the track or the loading surface of the vehicle and the bank, while in the second use each individual vehicle has to be provided with such a ramp.

Of course, the ideal condition would be that independently of the particular use of the vehicle, it has basic utility and can always be interchanged with other vehicles. This then means that each individual vehicle can be used as a bridge construction unit, a component for a ferry as a single ferry, and with the first two mentioned uses, above all, as a bridge end or the bank side of the ferry.

The development of vehicles of this type has followed different directions in which the problem in accordance with the invention is met to a certain extent but none of the previous developments represent a maximum of multiple utility that could be achieved.

There are vehicles which are primarily intended for use as bridge construction elements and which have a track element that is pivotable about a vertical axis which is aligned in the longitudinal direction of the vehicle during travel on land and is moved by an angle of 90° as the vehicle is deployed as a bridge construction unit and is then connected with corresponding bridge construction elements of adjacent vehicles. These bridge construction elements can be assembled to constitute a floating bridge of any desired length. The two end vehicles which provide the connection of the bridge with the two opposite banks, however, require an additional ramp which is pivotally joined to one end of the track element and foldable thereon.

Vehicles of this type are able to develop considerable buoyancy and are able to maintain the transit load predetermined by the profiles of the tunnels of railroads, especially if they are provided with additional inflatable lateral floating bodies which can be readily arranged. In order to complete the bridge one requires, however, the two special ramp members, which necessitates specially equipping two vehicles which can then be deployed interchangeably but not without some complications as normal bridge construction units in the train or assembly of the floating bridge. If one of these vehicles is omitted, the bridge cannot be deployed. Besides, the inflatable lateral floats require a preparation time of 25 minutes before the vehicles are in condition for deployment.

The deployment of such vehicles as parts of a ferry presents still greater problems, while the deployment as individual vehicles is practically completely out of question. For that reason there are such vehicles which, if provided with suitable ramps, can be utilized as individual vehicles or connected in multiples to constitute a larger ferry. Such vehicles, however, then are not suitable for service as structural units for a floating bridge.

In order to provide a synthesis, it was furthermore proposed to provide a vehicle which is in the form of a single unit vehicle for bridge members and for ramp stretches. In this type of structure pivotable ramp stubs are provided with further track plates which can then be connected with adjacent vehicles to constitute a floating bridge or to constitute a ferry, but which furthermore can also be utilized as specific ramp members for constituting a connection with the shore. The track plates are carried along upon the vehicle proper, and during travel on land they are accommodated in recesses for unfoldable fixed lateral floats. With these floats a relatively large track width can be attained which permits two-way traffic. These vehicles are distinguished by their great water velocity and light weight, while maintaining the transit load requirements does not present any obstacles.

The relatively small ramp length, however, is a shortcoming. Also these vehicles require a relatively longer assembly period in the water than the bridge units described above because the individual ramp portions have to be placed by means of a deck crane. Since the lateral floats are fixed, they are more readily damaged during collisions with neighboring vehicles than the inflatable elastic floats of the vehicles described above.

Particularly in the United States, no attention was paid to the transit load requirement in the development of such vehicles, so that relatively large vehicles were built which do not have lateral floats and therefore require merely a relatively short assembly time in the assembly of floating bridges or ferries. For example, a ferry having a carrying capacity of sixty tons can be assembled without any special preparations in approximately six minutes' time.

However, these vehicles have the shortcoming that they are not unitary vehicles but vehicles that are differently equipped for service as a bridge span, on the one hand, and for serving as the ramp end, on the other hand. For the land transport they are of considerable excess width, and if it is at all possible to transport them by rail, large parts must be disassembled. Finally, the useful buoyancy of the vehicle is relatively small.

Accordingly it is an object of the present invention to provide an amphibious vehicle which meets the requirements of the previously designed vehicles mentioned above, i.e., a vehicle which has great buoyancy or great loading capacity per vehicle, especially a unit vehicle which must serve as a bridge and as a ramp portion alike, and which without any auxiliary means and without any additional structural component not carried along, can be deployed for both purposes. Finally, the vehicle must afford rapid deployment time without the requirement of a special preparation period for bridges or for ferries. Low weight is a matter of course, at least in Europe that is necessary so that the transit load measures are maintained. Thus it must not be excessively wide in the street and, above all, it must be adapted to be transported by rail without special measures being taken. It is furthermore important to provide the possibility of two-way traffic upon the bridge when the vehicle is deployed as a structural bridge element for a floating bridge. Finally, the elements for a ramp provided with each vehicle must be constructed in such a manner that the ramp will have considerable length in order to insure smooth and unimpeded travel connections between the bridge or vehicle and the shore also in the presence of difficult shore conditions.

The problem in accordance with the invention is solved by an amphibious vehicle which is equipped in a known manner with a bridge element that is pivotable about a vertical axis but one end of this bridge element is in the form of a ramp member which is pivotally movable about a horizontal axis that extends transversely of the direction of travel and which at the center is further divided by a horizontal axis extending transversely to the track.

The fixed part of this bridge construction element which is pivotable about the vertical axis can furthermore be displaced longitudinally relative to the vertical pivot axis.

That portion of the bridge construction element which is designed to serve as a ramp has its outer half folded over the inner half. The outer half of the element can be rapidly and simply unfolded by means of a suitably arranged hydraulic cylinder when the track is turned 90° about the pivot axis.

The bridge construction element may also be provided with lateral track extensions.

By means of the laterally mounted inflatable elastic auxiliary floats that are preferably arranged in recesses in the walls the buoyancy can be increased considerably.

Further advantages and features as well as details of the invention will become apparent from the following specification with reference to the drawings, which schematically illustrate exemplary embodiments of the invention.

Figure 5:
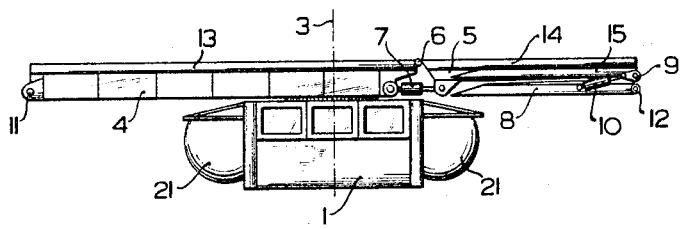
Figure 6:
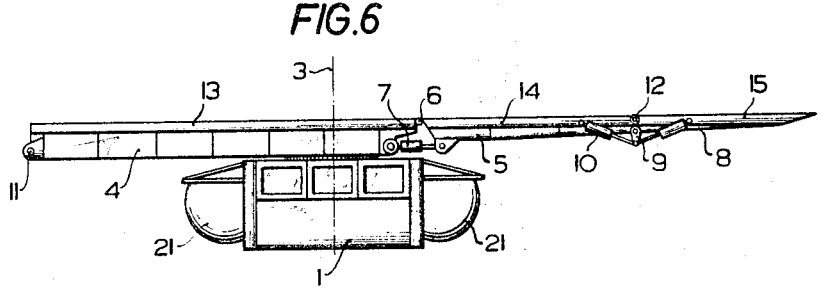
Figure 7:
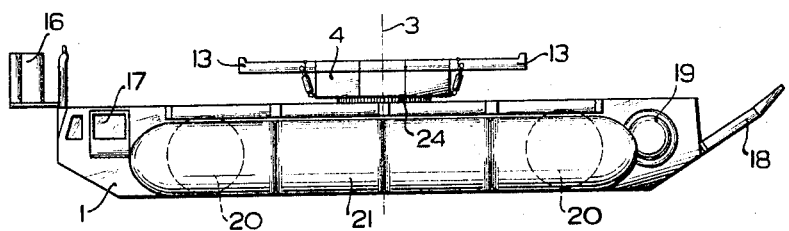
Figure 8:
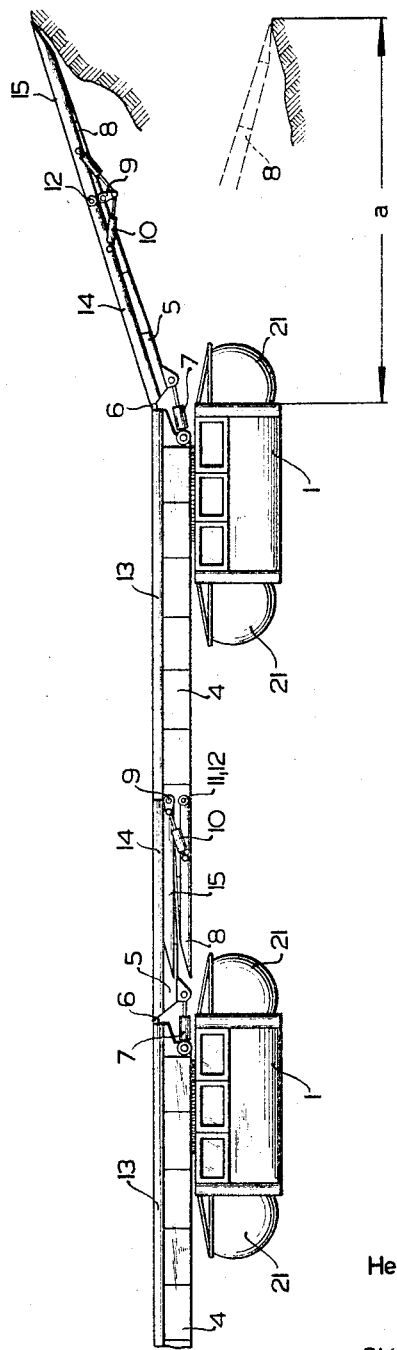
Figure 9:
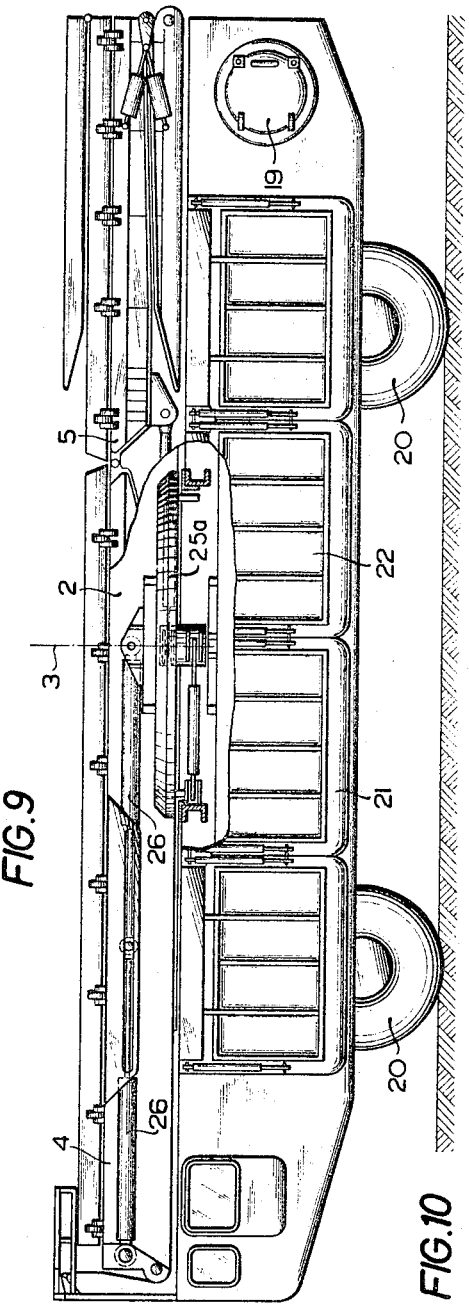
Figure 10:
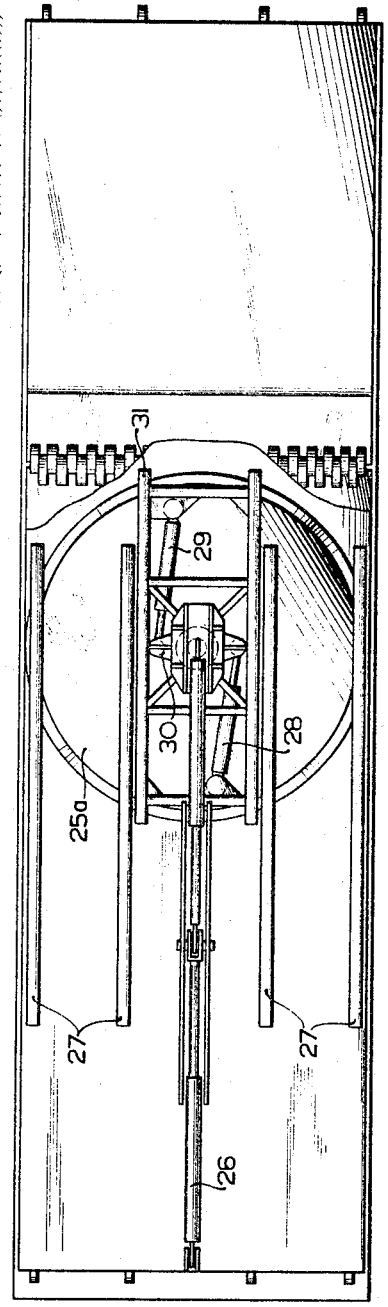

In the drawings:
FIG. 1 is a side view of the vehicle,
FIG. 2 is a front view,
FIG. 3 is an end view,
FIG. 4 is a top view showing the vehicle in water traveling condition,
FIG. 5 is a view showing the vehicle also in water traveling condition as a bridge unit or as a part of a ferry,
FIG. 6 is a similar view of the vehicle arranged as a bridge unit or bank approach end of a ferry,
FIG. 7 shows the vehicle also in water traveling condition with the track turned through an angle of 90°,
FIG. 8 shows a view of two vehicles coupled to constitute, for example, the end of a floating bridge,
FIG. 9 is a side elevational view with parts broken away of a vehicle in accordance with the invention having a longitudinally slidable track element, and
FIG. 10 is a top plan view of the mechanism including a hydraulic system for moving the track of the vehicle in accordance with FIG. 9.

The amphibious vehicle in accordance with the invention has a vehicle housing 1 which is in the form of a pontoon and is utilized as the main floating body of the vehicle. The vehicle body 1 supports a track element 2 which is pivotally movable in a horizontal plane about a vertical axis 3. This track element 2 is subdivided into a unitary structural portion 4 that is rigidly connected with the vertical pivot axis and a section or portion 5 which is constructed in the form of a ramp and is intended to be used as such. This section 5 is linked or coupled with section 4 at 6 and may be pivotally moved about the pivot means 6 out of its horizontal position upwardly and downwardly by hydraulic means.

The section 5 furthermore continues into an end portion 8 which in the illustrated position of the track element 2 is folded under the section 5 about a horizontal pivot axis 9. For unfolding or swinging open the end portion 8 to a position extending in a plane with the section 5 a hydraulic cylinder combination 10 is provided.

The track element is provided with connecting lugs 11, 12 at the opposite ends thereof for connecting thereto similarly constructed track elements to construct a floating bridge.

In order to permit widening the track or loading surface, side members 13, 14 and 15 are provided which, during travel on land are disposed in folded over condition and which when the unit is deployed as bridge element or as portion of a ferry can be unfolded outwardly.

The vehicle has furthermore a steering or piloting stand 16 which can be unfolded for travel on land and which is located above the steering or pilot cabin 17, and a flood guard 18 to improve the floating conditions. An entrance opening is provided at 19. Furthermore the vehicle is provided with wheels 20, that can be retracted, as well as with lateral floating elements 21 which, in the embodiment shown are subdivided longitudinally of the vehicle and which, during travel on land are accommodated in deflated condition in side pockets or recesses of the housing 1. However, for travel on water they can be rapidly inflated and then emerge laterally in order to essentially increase the width and the buoyancy. If desired, covers 22 may be provided for these lateral floating elements 21. Rudder propellers or outboard drives 23 are provided at both ends for propulsion in the water.

When the vehicle is deployed as a bridge member or as a part of a ferry the track element 2 is turned through an angle of 90° about a vertical axis 3. For this purpose an interposed stationary rotatable element such as a toothed rack 24 is utilized which is known per se and which is driven by pawls or pinions. The side members or sections 13 and 14 are unfolded outwardly in order to increase the surface area of the roadway or track or the loading surface. The individual track elements are connected with one another by means of the connecting lugs 11 and 12. On the two end vehicles of a floating bridge the terminal section 8 of the track area 5 is now swung out by means of cylinders 10 and then latched onto the track portion 5. In the same manner the side members 15 are swung about the pivot links 25 in order to provide the full track width for the ramp area thus formed. It is now possible to utilize the area of the track element from the pivot axis 6 onward as a ramp the length of which can meet all practical requirements. It is furthermore possible to provide for longitudinal sliding of the entire track element in the direction of its length, which requires merely the interposing of a suitably constructed sliding track and a slide member between the rotatable circular toothed rack 24 and the track portion 4. In this manner it is possible to obtain a further lengthening of the ramp area and a displacement of the buoyant forces.

The two armed rotatable lever element 30 which constitutes the main pivot element is also connected with said circular track element 25a above which the runway element 2 is supported, and actuation of hydraulic cylinders 28 and 29 rotates the rotatable track element 25a with the runway element 2 about the vertical pivot of the main pivot element.

In the vehicle illustrated in FIG. 9 and as shown more in detail in FIG. 10 the rotating system comprising a toothed rack and pawls or pinions is replaced by a hydraulic system by means of which the track unit can be moved longitudinally of the vehicle. Two hydraulic cylinders 26 arranged in alignment between the vertical axis of rotation 3 and the track or runway element 2 are operative to slidingly and longitudinally move the element 2. This arrangement permits of slidingly moving the element 2 on the rails 27 on which it rests across the circular track element 25a. The lengthening of the range of the runway allows better adaptation to bank or shore conditions and, in addition, a displacement of the buoyant forces is obtainable.

A hydraulic system comprising a pair of double acting cylinders 28, 29 which are actuated in opposite directions serves for rotating the track or runway element.

Cylinder 28 engages with one end a pivotally supported, two armed lever 30 and has its other end pivotally connected to the body of the vehicle. Cylinder 29 which is displaced by an angle of 180° with respect to cylinder 28 is also secured at one end to the two armed rotatable lever 30, while its other end is connected to the rotatable slide 31.

The track element areas or sections 5, 8, 14 and 15 are swung out in the same manner when the vehicle is used, for example, as the head vehicle of a ferry by means of which the ferry can approach the bank or shore.

While FIG. 1 illustrates the vehicle in accordance with the invention in the condition for land travel, where the longitudinal axis of the bridge element 2 registers with the longitudinal axis of the vehicle body 1 and the foldable parts of the bridge element are in folded in condition (which is also the case in FIG. 2), FIG. 4 shows a plan view of the vehicle in condition of deployment. The track element 2 is turned around 90°, the side sections 13 and 15 are flapped out, while the terminal sections of the track element are cut off. The lateral floats are inflated. In FIG. 3 the left float is shown in inflated condition and the right side float is shown in collapsed condition.

FIG. 5 illustrates the vehicle in its condition of deployment as a part of a floating bridge or of a ferry, in FIG. 6 the section 5, 8 is unfolded as a ramp, while FIG. 7 illustrates the vehicle again as a part of a bridge or ferry in a view where it is turned by an angle of 90° with respect to FIG. 5. Thus the track element 2 is turned by 90°. The side floats are inflated, the wheels are retracted and the pilot stand for water travel is unfolded.

Finally, FIG. 8 illustrates two of the vehicles in accordance with the invention in the coupled condition, for example, as end vehicle portion of a floating bridge, with the penultimate vehicle with the track sections 5, 8 in folded condition coupled to the last vehicle (at the right). The latter has its sections 5, 8 unfolded to constitute ramps. This permits of bridging the distance $a$ and it does not matter whether the shoreline is higher or lower than the plane in which the road track of the bridge is disposed. The same is of course also true when the vehicles are deployed, with several of them connected as a unit, as a ferry or if they are used alone as a single ferry.

Thus the problem of providing a single vehicle which meets all the requirements of deployment without it being necessary to exchange or supplement components, or that components must be available apart from the vehicles is thus solved for the first time by the amphibious vehicle in accordance with the invention. In addition all other essential points mentioned in the preamble of the specification in regard to the deployment of the vehicle have been considered. Consequently the invention provides a unitary vehicle for a bridge portion as well as a ramp portion or a ferry.

Having now described my invention with reference to the embodiment illustrated in the drawings, I do not wish to be limited thereto, but what I desire to protect by Letters Patent of the United States is set forth in the appended claims.

I claim:

1. An amphibious vehicle of the type comprising a buoyant mobile structure including a housing and a bridge track and ramp element supported on said housing, said bridge track element being defined by a horizontal track portion mounted on a pivot element including a lever rotatable about a vertical pivot and by a ramp portion, horizontal pivot means extending transversely of and intermediate said horizontal track portion and said ramp portion and supporting said ramp portion at one end of said horizontal track portion for movement about a horizontal axis, said ramp portion being divided in two portions substantially centrally thereof and constituting a main ramp portion and an end ramp portion, and second transverse pivot means supporting said end ramp portion on said main ramp portion, said end ramp portion being disposed below said main ramp portion in the folded condition of said ramp.

2. An amphibious vehicle of the type comprising a buoyant mobile structure including a housing and a bridge track and ramp element supported on said housing, said bridge track element being defined by a horizontal track portion mounted on a pivot element including a lever rotatable about a vertical pivot and by a ramp portion, horizontal pivot means extending transversely of and intermediate said horizontal track portion and said ramp portion and supporting said ramp portion at one end of said horizontal track portion for movement about a horizontal axis, said ramp portion being divided in two portions substantially centrally thereof and constituting a main ramp portion and an end ramp portion, and second transverse pivot means supporting said end ramp portion on said main ramp portion, said end ramp portion being disposed below said main ramp portion in the folded condition of said ramp, and means permitting displacement of said horizontal track portion in the direction of its length including a sliding track and a slide member interposed between said rotatable element and said horizontal track portion and hydraulic cylinder means operatively connected intermediate said horizontal track element and said pivot element.

3. An amphibious vehicle of the type comprising a buoyant mobile structure including a housing and a bridge track and ramp element supported on said housing, said bridge track element being defined by a horizontal track portion mounted on a pivot element including a lever rotatable about a vertical pivot and by a ramp portion, horizontal pivot means extending transversely of and intermediate said horizontal track portion and said ramp portion and supporting said ramp portion at one end of said horizontal track portion for movement about a horizontal axis, said ramp portion being divided in two portions substantially centrally thereof and constituting a main ramp portion and an end ramp portion, and second transverse pivot means supporting said end ramp portion on said main ramp portion, said end ramp portion being disposed below said main ramp portion in the folded condition of said ramp, and hydraulic means intermediate said end ramp portion and said main ramp portion operative to fold said end ramp portion under said main ramp portion and to unfold said end ramp portion from folded condition.

4. An amphibious vehicle of the type comprising a buoyant mobile structure including a housing and a bridge track and ramp element supported on said housing, said bridge track element being defined by a horizontal track portion mounted on a pivot element including a lever rotatable about a vertical pivot and by a ramp portion, horizontal pivot means extending transversely of and intermediate said horizontal track portion and said ramp portion and supporting said ramp portion at one end of said horizontal track portion for movement about a horizontal axis, said ramp portion being divided in two portions substantially centrally thereof and constituting a main ramp portion and an end ramp portion, and second transverse pivot means supporting said end ramp portion on said main ramp portion, said end ramp portion being disposed below said main ramp portion in the folded condition of said ramp, and hydraulic means intermediate said end ramp portion and said main ramp portion operative to fold said end ramp portion under said main ramp portion and to unfold said end ramp portion from folded condition, said horizontal track portion and said ramp portion having lateral sections pivotally connected to the sides thereof and movable into unfolded positions to increase the width of said bridge track element.

5. An amphibious vehicle of the type comprising a buoyant mobile structure including a housing and a bridge track element supported on said housing, said bridge track element being defined by a horizontal track portion mounted on and movable about a vertical pivot and by a ramp portion, horizontal pivot means extending transversely of and intermediate said horizontal track portion and said ramp portion and supporting said ramp portion at one end of said horizontal track portion, for movement about a horizontal axis, said ramp portion being divided in two portions substantially centrally thereof and constituting a main ramp portion and an end ramp portion, and second transverse pivot means supporting said end ramp portion on said main ramp portion, and hydraulic means intermediate said end ramp portion and said main ramp portion operative to fold said end ramp portion under said main ramp portion and to unfold said end ramp portion from folded condition, said horizontal track portion and said ramp portion having lateral sections pivotally connected to the sides thereof and movable into unfolded positions to increase the width of said track, and said housing having recesses laterally thereof and elastic auxiliary inflatable float elements being provided, accommodated in collapsed condition in said recesses and covers pivotally mounted over said floats retaining said float elements in said recesses, said covers in the inflated condition of said floats being supported by said floats.

References Cited by the Examiner

UNITED STATES PATENTS 2,981,221    4/1961    Gillois et al. _____ 115—1

FOREIGN PATENTS 799,232    3/1936    France.

MILTON BUCHLER, *Primary Examiner.*

ANDREW H. FARRELL, *Examiner.*